United States Patent [19]

Campbell et al.

[11] 4,038,259

[45] July 26, 1977

[54] PRODUCTION OF P-PHENYLENE SULFIDE POLYMERS

[75] Inventors: Robert W. Campbell; James T. Edmonds, Jr., both of Bartlesville, Okla.

[73] Assignee: Phillips Petroleum Company, Bartlesville, Okla.

[21] Appl. No.: 581,332

[22] Filed: May 27, 1975

[51] Int. Cl.² .............................................. C08G 75/16
[52] U.S. Cl. ...................................... 260/79.1; 260/79
[58] Field of Search .............................. 260/79, 79.1

[56] References Cited

U.S. PATENT DOCUMENTS

| | | | |
|---|---|---|---|
| 3,607,843 | 9/1971 | Vidaurri, Jr. ........................ | 260/79 |
| 3,699,087 | 10/1972 | Wood et al. ......................... | 260/79 |
| 3,725,362 | 4/1973 | Walker ................................ | 260/79 |
| 3,737,411 | 6/1973 | Scoggins ............................. | 260/63 R |
| 3,763,124 | 10/1973 | Edmonds, Jr. ...................... | 260/79.1 |
| 3,786,035 | 1/1974 | Scoggin .............................. | 260/79.1 |
| 3,919,177 | 11/1975 | Campbell ........................... | 260/79.1 |

*Primary Examiner*—Melvyn I. Marquis

[57] ABSTRACT

A method is provided for producing p-phenylene sulfide polymers by contacting a p-dihalobenzene, an alkali metal sulfide, an alkali metal carboxylate, an organic amide, and an alkali metal carbonate at polymerization conditions. The use of an alkali metal carbonate in addition to the other compounds contacted to form a composition results in p-phenylene sulfide polymers of higher molecular weight than produced without the alkali metal carbonate, as evidenced by higher inherent viscosity and lower melt flow of the polymer than produced by compared methods.

12 Claims, No Drawings

PRODUCTION OF P-PHENYLENE SULFIDE POLYMERS

BACKGROUND OF THE INVENTION

This invention relates to the production of p-phenylene sulfide polymers. In one of its aspects this invention relates to a novel method for producing novel p-phenylene sulfide polymers, and to the polymers themselves. In another of its aspects this invention relates to producing p-phenylene sulfide polymers of higher molecular weight using a specific chemical compound in the reaction mixture than are produced without using the specific chemical compound in the reaction mixture. In yet another of its aspects this invention relates to the use of an alkali metal carbonate in the reaction mixture in the production of p-phenylene sulfide polymers.

The preparation of p-phenylene sulfide polymers having higher molecular weight as evidenced by lower melt flow without curing the polymers as compared to p-phenylene sulfide polymers known in the art is of particular interest since lower melt flows, particularly within the range of 1 to about 700 as determined by the method of ASTM D 1238-70, are particularly useful in the production of fibers, molded objects and filaments since the usual curing step is obviated.

It is therefore an object of this invention to produce p-phenylene sulfide polymers of increased molecular weight as compared to those produced by prior art methods.

Other aspects, objects and the various advantages of this invention will become apparent upon reading this specification and the appended claims.

STATEMENT OF THE INVENTION

In accordance with this invention, in the production of a p-phenylene sulfide polymer by contacting at least one p-dihalobenzene, at least one alkali metal sulfide, at least one alkali metal carboxylate, and at least one organic amide to form a composition, as in copending application Ser. No. 495,450 filed Aug. 9, 1974, the use, additionally, of at least one alkali metal carbonate in the composition results in a p-phenylene sulfide polymer of higher molecular weight, as evidenced by a lower melt flow and a higher inherent viscosity, than that obtained without the addition of an alkali metal carbonate to the composition.

In one embodiment of the present invention, at least one p-dihalobenzene is reacted, under polymerization conditions for a period of time sufficient to form a p-phenylene sulfide polymer, with a mixture in which at least one alkali metal sulfide, at least one alkali metal carboxylate, at least one alkali metal carbonate, and at least one organic amide are contacted.

p-Dihalobenzenes which can be employed in the process of this invention can be represented by the formula

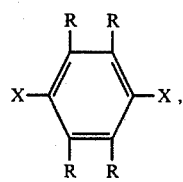

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Alkali metal sulfides which can be employed in the process of this invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture.

Alkali metal carboxylates which can be employed in the process of this invention can be represented by the formula R'CO$_2$M, where R' is a hydrocarbyl radical selected from alkyl, cycloalkyl, and aryl, and combinations thereof such as alkaryl, aralkyl, and the like, the number of carbon atoms in said R' being within the range of 1 to about 20, and M is an alkali metal selected from lithium, sodium, potassium, rubidium, and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

Alkali metal carbonates which can be employed in the process of this invention include lithium carbonate, sodium carbonate, potassium carbonate, rubidium carbonate, cesium carbonate, and mixtures thereof.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Although the mole ratio of p-dihalobenzene to alkali metal sulfide can vary over a considerable range, generally it will be within the range of about 0.9:1 to about 2:1, preferably about 0.95:1 to about 1.2:1 The mole ratio of alkali metal carboxylate to alkali metal sulfide can vary over a wide range but generally will be within the range of about 0.05:1 to about 4:1, preferably about 0.1:1 to about 2:1. Although the mole ratio of alkali metal carbonate to alkali metal sulfide can vary over a considerable range, generally it will be within the range of about 0.05:1 to about 1:1, preferably about 0.1:1 to about 0.5:1. The amount of organic amide can vary greatly, generally being within the range of about 100 grams to about 2500 grams per gram-mole of alkali metal sulfide.

Although the reaction temperature at which the polymerization is conducted can vary over a wide range, generally it will be within the range of about 125° C to about 450° C, preferably about 175° C to about 350° C. The reaction time can vary widely, depending in part on the reaction temperature, but generally will be within the range of about 10 minutes to about 72 hours, preferably about 1 hour to about 8 hours. The pressure should be sufficient to maintain the p-dihalobenzene and organic amide substantially in the liquid phase.

It is to be understood that the process of this invention can be carried out by mixing the p-dihalobenzene, the alkali metal sulfide, the alkali metal carboxylate, the alkali metal carbonate, and the organic amide in any order. It is also to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances water can be removed from the resulting composition, e.g., by distillation. For instance, water can be removed by distillation from a mixture of the organic amide, the alkali metal carbonate, the alkali metal carboxylate, e.g., as a hydrate, and the alkali metal sulfide in hydrated form or as an aqueous mixture, after which the residual mixture can be admixed with the p-dihalobenzene and the resulting mixture then maintained at polymerization conditions.

The p-phenylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer.

The p-phenylene sulfide polymers produced by the process of this invention can be blended with fillers, pigments, extenders, other polymers and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers.

EXAMPLES

In the following Examples, melt flow values were determined by the method of ASTM D 1238-70, modified to a temperature of 600° F (316° C) using a 5-kg weight, the value being expressed as g/10 min. Values for inherent viscosity were determined at 206° C in 1-chloronaphthalene at a polymer concentration of 0.4 g/100 ml solution. Values for glass transition temperature (Tg) and crystalline melting point ($T_m$) were determined on premelted and quenched polymer samples by differential thermal analysis.

EXAMPLE I

In a control run outside the scope of this invention, 65.2g (0.5 mole, 60 percent assay) sodium sulfide, 0.2g sodium hydroxide (to react with sodium bisulfide and sodium thiosulfate present in trace amounts in the sodium sulfide), 51.0g (0.5 mole) lithium acetate dihydrate, and 158.3g N-methyl-2-pyrrolidone were charged to a stirred 1-liter autoclave, which was then flushed with nitrogen. Dehydration of the mixture by heating to 207° C yielded 39 ml of distillate containing 35.4g water. To the residual mixture were charged 74.95g (0.51 mole) p-dichlorobenzene and 40g N-methyl-2-pyrrolidone. The resulting mixture was heated for 3 hours at 265° C at a pressure of 75–105 psig. The reaction product was washed eight times with hot water and dried at 80° C under nitrogen in a vacuum oven to obtain a yield of 48.9g poly(p-phenylene sulfide) having a melt flow of 288, an inherent viscosity of 0.30, a Tg of 85° C, and a $T_m$ of 282° C.

EXAMPLE II

In a run within the scope of this invention, 65.2g (0.5 mole, 60 percent assay) sodium sulfide, 0.2g sodium hydroxide (to react with sodium bisulfide and sodium thiosulfate present in trace amounts in the sodium sulfide), 51.0g (0.5 mole) lithium acetate dihydrate, 7.39g (0.1 mole) lithium carbonate, and 158.3g N-methyl-2-pyrrolidone were charged to a stirred 1-liter autoclave, which was then flushed with nitrogen. Dehydration of the mixture by heating to 205° C yielded 36 ml of distillate containing 33.7g water. To the residual mixture was charged 74.95g (0.51 mole) p-dichlorobenzene and 40g N-methyl-2-pyrrolidone. The resulting mixture was heated for 3 hours at 265° C at a pressure of 70–115 psig. The reaction product was washed eight times with hot water and dried at 80° C under nitrogen in a vacuum oven to obtain a yield of 48.7g poly(p-phenylene sulfide) having a melt flow of 227, an inherent viscosity of 0.31, a Tg of 88° C, and a $T_m$ of 280° C.

Thus, based on melt flow and inherent viscosity, the poly(p-phenylene sulfide) produced in this Example was of higher molecular weight than that produced in Example I, in which lithium carbonate was not employed.

EXAMPLE III

In another run within the scope of this invention, 65.2g (0.5 mole, 60 percent assay) sodium sulfide, 0.2g sodium hydroxide (to react with sodium bisulfide and sodium thiosulfate present in trace amounts in the sodium sulfide), 51.0g (0.5 mole) lithium acetate dihydrate, 10.6g (0.1 mole) sodium carbonate, and 158.3g N-methyl-2-pyrrolidone were charged to a stirred 1-liter autoclave, which was then flushed with nitrogen. Dehydration of the mixture by heating to 205° C yielded 38 ml of distillate containing 34.4g water. To the residual mixture were charged 74.95g (0.51 mole) p-dichlorobenzene and 40g N-methyl-2-pyrrolidone. The resulting mixture was heated for 3 hours at 265° C at a pressure of 70–115 psig. The reaction product was washed eight times with hot water and dried at 80° C under nitrogen in a vacuum oven to obtain a yield of 48.8g poly(p-phenylene sulfide) having a melt flow of 238, an inherent viscosity of 0.33, a Tg of 87° C, and a $T_m$ of 279° C.

Thus, based on melt flow and inherent viscosity, the poly(p-phenylene sulfide) produced in this Example was of higher molecular weight than that produced in Example I, in which sodium carbonate was not employed.

EXAMPLE IV

In a larger scale control run outside the scope of this invention, 983.7g (7.53 moles, 59.7 percent assay) sodium sulfide, 765g (7.50 moles) lithium acetate dihydrate, and 3000 ml (3078g) N-methyl-2-pyrrolidone were charged to a stirred 2-gallon autoclave, which was then flushed with nitrogen. Dehydration of the mixture by heating to 400° F (204° C) yielded 640 ml of distillate comprising primarily water. To the residual mixture were charged 1137.1g (7.73 moles) p-dichlorobenzene and 500 ml (513g) N-methyl-2-pyrrolidone. The resulting mixture was heated for 3 hours at 510° F (266° C) at a maximum pressure of 160 psig. Gaseous carbon dioxide (50g) was then added to the reaction mixture, while cooling, to aid in subsequent filtration, and the resulting product was washed four times with water and dried in a vacuum oven to obtain a yield of 644.4g poly(p-phenylene sulfide) having a melt flow of 878 and an inherent viscosity of 0.22.

EXAMPLE V

In a larger scale run within the scope of this invention, 983.7g (7.53 moles, 59.7 percent assay) sodium sulfide, 765g (7.50 moles) lithium acetate dihydrate, 186g (1.75 moles) sodium carbonate, and 3000 ml (3078g) N-methyl-2-pyrrolidone were charged to a stirred 2-gallon autoclave, which was then flushed with nitrogen. Dehydration of the mixture by heating to 400° F (204° C) yielded 615 ml of distillate comprising primarily water. To the residual mixture were charged 1137.1g (7.73 moles) p-dichlorobenzene and 500 ml (513g) N-methyl-2-pyrrolidone. The resulting mixture was heated for 3 hours at 510° F (266° C) at a maximum pressure of 150 psig. Gaseous carbon dioxide (50g) was then added to the reaction mixture, while cooling, to aid in subsequent filtration, and the resulting product was washed four times with water and dried in a vacuum oven to obtain a yield of 702.6g poly(p-phenylene sulfide) having a melt flow of 300 and an inherent viscosity of 0.28.

Thus, based on melt flow and inherent viscosity, the poly(p-phenylene sulfide) produced in this Example was of higher molecular weight than that produced in Example IV, in which sodium carbonate was not employed.

We claim:
1. A method for producing polymers comprising:
   a. forming a composition by contacting at least one p-dihalobenzene, at least one alkali metal sulfide, at least one alkali metal carboxylate, at least one organic amide, and at least one alkali metal carbonate, and
   b. maintaining at least a portion of said composition at polymerization conditions to produce a polymer.
2. A method of claim 1 wherein a first composition comprising:
   a. a mixture of at least one alkali metal sulfide, at least one alkali metal carboxylate, at least one alkali metal carbonate, and at least one organic amide is formed, and
   b. at least a portion of said mixture is contacted with at least one p-dihalobenzene under polymerization conditions for a period of time sufficient to form a p-phenylene sulfide polymer.
3. A method of claim 1 wherein said p-dihalobenzene is represented by the formula

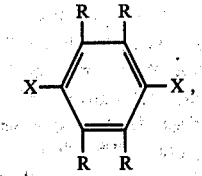

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl or aralkyl, the total number of carbon atoms in each molecule being within the range of 6 to about 24, with the proviso that in at least 50 mole percent of the p-dihalobenzene employed each R must be hydrogen.

4. A method of claim 2 wherein the p-dihalobenzene is represented by the formula

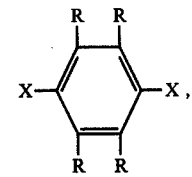

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl or aralkyl, the total number of carbon atoms in each molecule being within the range of 6 to about 24, with the proviso that in at least 50 mole percent of the p-dihalobenzene employed each R must be hydrogen.

5. A method of claim 3 wherein the mole ratio of p-dihalobenzene to alkali metal sulfide is within the range of about 0.9:1 to about 2:1, the mole ratio of alkali metal carboxylate to alkali metal sulfide is within the range of about 0.05:1 to about 4:1, and the mole ratio of alkali metal carbonate to alkali metal sulfide is within the range of about 0.05:1 to about 1:1.

6. A method of claim 4 wherein the mole ratio of p-dihalobenzene to alkali metal sulfide is within the range of about 0.9:1 to about 2:1, the mole ratio of alkali metal carboxylate to alkali metal sulfide is within the range of about 0.05:1 to about 4:1, and the mole ratio of alkali metal carbonate to alkali metal sulfide is within the range of about 0.05:1 to about 1:1.

7. A method of claim 5 wherein the polymerization conditions present comprise a reaction temperature within the range of about 125° C to about 450° C, a pressure sufficient to maintain the p-dihalobenzene and organic amide substantially in the liquid phase and the reaction time is in the range of about 10 minutes to about 72 hours.

8. A method of claim 6 wherein the polymerization conditions present comprise a reaction temperature within the range of about 125° C to about 450° C, a pressure sufficient to maintain the p-dihalobenzene and organic amide substantially in the liquid phase and the reaction time is in the range of about 10 minutes to about 72 hours.

9. A method of claim 7 wherein said alkali metal carbonate is chosen from among sodium carbonate, potassium carbonate, rubidium carbonate, cesium carbonate, lithium carbonate, and mixtures thereof.

10. A method of claim 8 wherein said alkali metal carbonate is chosen from among sodium carbonate, potassium carbonate, rubidium carbonate, cesium carbonate, lithium carbonate, and mixtures thereof.

11. A method of claim 10 wherein said p-dihalobenzene is p-dichlorobenzene, said alkali metal sulfide is sodium sulfide, said alkali metal carboxylate is lithium acetate dihydrate, said organic amide is N-methyl-2-pyrrolidone, and said alkali metal carbonate is sodium carbonate; the reaction temperature is within the range of about 175° C to about 350° C and the reaction time is within the range of about 1 hour to about 8 hours.

12. A method of claim 10 wherein said p-dihalobenzene is p-dichlorobenzene, said alkali metal sulfide is sodium sulfide, said alkali metal carboxylate is lithium acetate dihydrate, said organic amide is N-methyl-2-pyrrolidone, and said alkali metal carbonate is lithium carbonate; the reaction temperature is within the range of about 175° C to about 350° C and the reaction time is within the range of about 1 hour to about 8 hours.

* * * * *